No. 861,832. PATENTED JULY 30, 1907.
R. T. HAINES.
KINEMATOGRAPHIC APPARATUS.
APPLICATION FILED JAN. 6, 1905.

WITNESSES:
W. M. Avery
W. Harrison

INVENTOR
Robert T. Haines
BY Munn & Co
ATTORNEYS

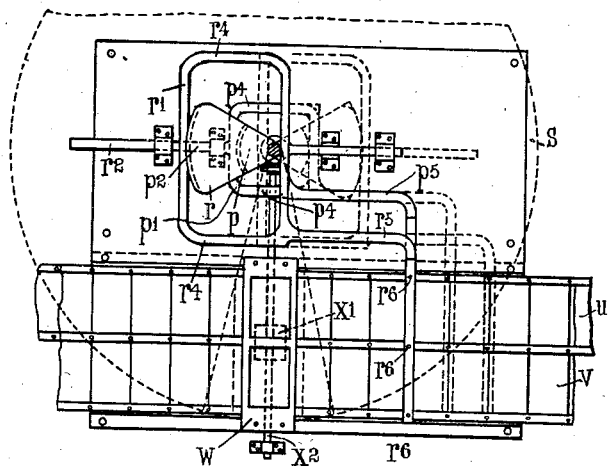

UNITED STATES PATENT OFFICE.

ROBERT THORN HAINES, OF MELBOURNE, VICTORIA, AUSTRALIA.

KINEMATOGRAPHIC APPARATUS.

No. 861,832.  Specification of Letters Patent.  Patented July 30, 1907.

Application filed January 6, 1905. Serial No. 239,863.

*To all whom it may concern:*

Be it known that I, ROBERT THORN HAINES, a subject of the King of Great Britain, residing at Melbourne, in the State of Victoria, in the Commonwealth of Australia, agent, have invented certain new and useful Improved Kinematographic Apparatus, of which the following is a specification.

This invention relates to mechanism designed to produce a more perfect reproduction of living pictures or animated scenes upon any desired exhibiting surface by obviating the fluctuation of light, flickering and blurring and by minimizing the vibration and unsteadiness, spots and other imperfections or irregularities, which render so unsatisfactory all the processes and mechanisms for the purpose at present in use.

The essential feature of the invention is an arrangement for obtaining absolute constancy as to intensity and volume of the projected image.

In processes hitherto in use the successive pictures which go to make up an animated scene are projected in very rapid succession and when each picture has been projected the light is wholly or partially cut off while the next picture in succession is brought into place, or else the picture is rapidly drawn away during projection without being obscured. This momentary obscuration or momentary movement of the picture is the chief source of the appearances of fluctuation of light, flickering, blurring and similar defects observable on the screen.

In the present invention it is arranged that as each picture is hidden by the movement of the screen across the surface of the film a second picture shall simultaneously begin to be uncovered, so that at any instant during the change from one picture to the next the image on the screen will consist partly of a projection of one picture and partly of a projection of the next succeeding picture. It will be obvious that though the succeeding pictures in the series which represent an animated scene are not identical the difference between them is so small that the complementary parts of two successive pictures will project into a single complete picture,—at any rate so nearly as the eye can see.

The invention is illustrated by the accompanying drawings in which

Figure 1 is an elevation of the projector with the front plate removed, Fig. 2 is a plan view of the projector, Fig. 3 is a detail view of the sliding frame and its operating cam, and Fig. 4 is a plan of the printing appliance.

In Figs. 1 and 2, $a$ is the front plate of the projector and $a'$ the back plate, the two plates being held apart by distance pieces $b$. $c$ is the main driving shaft operated from the handle $c'$. This shaft $c$ gears, by means of two bevel wheels $c^2$ and $d$, with the cross shaft $d'$. $d^2$ is a large toothed wheel gearing with smaller toothed wheels $e'$ and $m'$. Upon the shafts $e$ and $m$ respectively of these two small pinions are fastened cams $e^2$ and $m^2$; these cams revolve within frameworks $f$ and $m^3$ each of which is mounted on a cross shaft as at $f^2$. Each shaft slides in bearings as $f^3$. The ends $f^6$ of the sliding frame are formed with a cam surface which is more clearly seen in Fig. 3.

A pin $f^5$ projects from the cam $e^2$ and is adapted to travel over the inclined surface $f^6$ of the sliding frame. At $g$ and $g'$ are apertures in the back plate $a$ of the machine; against each aperture is arranged a hinged spring gate $g^2$, $g^3$ through which the film $i$ passes. $k$, $k$ are guide rods or projections on the back plate which maintain the alinement of the traveling film. Upon the shaft $e$, in addition to the cam $e^2$, there is mounted a semicircular disk shutter $e^3$ which is adapted to cover the opening $g$ in the back plate during one half of the revolution of the shaft $e$; a similar semi-circular disk shutter $m'$ is arranged in a similar way to cover the opening $g'$ of the back plate. This is mounted upon a cross shaft $n$ placed at a sufficient distance below the shaft $m$ to cause the shutter to pass over the opening which it is to cover. The shaft $n$ is turned by means of a pinion $n^2$ which is equal in size to the pinion $e'$ gearing with the large cog wheel $d^2$. The sliding frame $f$ has an arm $f'$ carrying pins $f^4$ which are adapted to be pressed into the traveling film.

The action of the mechanism is as follows: When the handle $c'$ is turned the large cog wheel $d^2$ revolves driving the pinions $e'$, $m'$, $n^2$; the cam $e^2$ revolving with the shaft $e$ engages the two straight edges of the sliding frame $f$ and during a part of the revolution moves the said frame laterally. When the lateral motion is completed the frame remains stationary until the cam is revolved far enough to bring its edges against the other straight edge of the sliding frame. Before this happens, however, the pin $f^5$ carried by the cam $f^2$ passes over one or other of the inclined surfaces $f^6$ and in so doing turns the whole frame $f$ about its axle $f^2$. Thus when the frame is in the position shown in Fig. 1, the revolution of the cam does not for the moment cause any lateral movement of the frame $f$. The pin $f^5$, however, passes over the cam surface $f^6$ and in so doing turns the frame $f$ and also the arm $f'$ so as to press the pins $f^4$ into the substance of the traveling film. When the edge of the cam strikes against the straight edge of the sliding frame the latter begins to move and the shaft $f^2$ slides in its bearings until the edge of the cam reaches approximately the middle point of the straight side of the frame. The lateral motion then ceases but shortly afterwards the pin $f^5$ bears upon the other cam surface $f^6$ the slope of this surface being in such a direction as to cause the arm $f'$ to be pressed away from the film thus drawing out the pins $f^4$. By the continued revolution of the cam the sliding frame is brought back to its first position but owing to the position of the arm $f'$ it does not carry the traveling film back with it.

Exactly the same cycle of operations occurs with the second frame $m^3$. Simultaneously with this movement of the film there is proceeding a revolution of the shutters $e^3$ and $n'$. These shutters are so arranged that the opening $g$ or $g'$ begins to be obscured and is wholly obscured while the part of the film at the time behind the opening is stationary. While the opening is obscured the movement of the film takes place and when it has again become stationary the shutter begins to uncover the opening. As will be seen from the position of the two shutters $e^3$ and $n'$ the opening $g$ is uncovered when the opening $g'$ is entirely covered and during the time that the openings are being covered or uncovered the part of one which is uncovered is exactly the complement at the part of the other which is covered. In this way there is projected upon the screen a steady picture which consists sometimes of the projection of a stationary film behind one of the openings $g$ and $g'$ and sometimes of the projection made up from two parts of a film one partly uncovered at the opening $g$ and the other partly uncovered at the opening $g'$. When the film is first inserted between the back plate and the guides $g$ and passed through the hinged spring and the guides $g^2$ and $g^3$ a loop is left between the two gates of gates $g^2$ and $g^3$ such a length that the movement of the film past the opening $g$ can take place without moving the part of the film which is opposite the opening $g'$.

It may be here noted that there are various arrangements of films which can be used in this type of projector. There may for instance be one positive film the width of two pictures having the odd and even series of pictures side by side. This is the type of film which is illustrated in Fig. 1 and it will be seen that the interval between picture No. 1 and picture No. 2 must be equal to the length of the requisite loop between the gates $g^2$ and $g^3$. Instead of the single film of double width two positive films may be employed, and if there is a negative series of pictures on one negative film alternate pictures are printed on each of the two positive films just as with one positive film alternate pictures are printed on one half and on the other. In either case sufficient distance has to be left between the pictures to allow of the loop projecting between the gates so that the motion of one part of the film can be independent of that of the other part.

It is obvious also that the system may be extended from a duplex system, as is illustrated, to a triplex or multiplex projecting system. Similarly also the shutters may be made to reciprocate instead of to revolve; and instead of being opaque they may if desired be graduated in transparency so that the light is gradually cut off from the whole of one picture while it is gradually allowed access to the other.

Together with the mechanism the duplex projector (or triplex or multiplex) of ordinary type is employed in which the projecting lenses may be either side by side or one above the other.

In order to produce a positive film having the odd and even series of pictures suitably arranged side by side on one film the width of the two pictures, special mechanism is employed, called for convenience the printing frame; this is illustrated in Fig. 4. In principle it is precisely similar to the projecting mechanism already described and only differs in such details as are necessary to obtain the desired result. Instead of a single film $i$ there are of course at least two films traveling and there may be three, for example one negative and two positive films. In the arrangement shown in Fig. 4 $u$ indicates the negative film and $v$ the positive film of double width upon which two alternate series of pictures are to be printed. Each of these films has to be moved at intervals and it will be obvious that since only the alternate pictures in a negative film are to be printed upon the positive film the negative film has to be moved twice as far at one step as the positive film moves. For this purpose the frame $r'$ which moves the negative film is made twice the size of the frame $p'$ by which the positive film is moved. Except for this difference, however, the structure of the mechanism is exactly as before. The two frames are provided with cam surfaces $r^4$ and $p^4$ and they obtain their motion from the revolution of the cams $r$ and $p$, being mounted on sliding shafts $r^2$ and $p^2$. The frames carry arms $r^5$ and $p^5$ respectively upon which are the pins $r^6$ which engage in the substance of the film to drag it along. The spring gate $w$ is naturally of slightly different form, being adapted to receive the two films of different widths. There is of course only a single shutter $s$ which is a disk of opaque material with a segment cut out. In addition to the mechanism used before, however, there is provided upon the shaft $x^2$ a cam $x'$ the purpose of which is merely to press the positive and negative films into close contact at the moment of their exposure to light.

The action of the mechanism is substantially similar to that of the projecting device described above. The two films are stationary during the time that the opening in the shutter is passing the spring gate and when the light is cut off by the shutter the films are caused to move by the revolution of the two cams $p$ and $r$, the negative film moving twice as far as the positive film. At the end of the lateral movement the pressure of the cam pins upon the cam surfaces $r^4$ and $p^4$ turns the frames so as to release the pins $r^6$ from the substance of the films. After the pins are thus disengaged a further revolution of the cams moves back the frames laterally and then the engagement of the cam pins with the second pair of the cam surfaces $p^4$ and $r^4$ causes the pins $r^6$ to be again inserted in the substance of the film in readiness for a new movement of the films. When the whole of one series of pictures is printed the films are again placed in proper position with the negative film on the other side and the other series is printed in a similar manner.

It will be obvious that there are a great number of modifications which may be introduced into the apparatus.

The parts marked $j$ are simply two lens cases in which are fixed the lenses through which the light passes to the photographic negative in the back of the apparatus.

What I claim is:

1. In mechanism for the production of "living pictures," the combination with a sliding shaft, a frame pivoted on this shaft, cam surfaces on said frame, and an arm carried by said frame, a rotating shaft, a cam revolved by said shaft, and a pin upon said cam, said pin and cam adapted to engage respectively with the cam surfaces and sides of said frames to cause alternately the lateral and angular oscillation of said frame, with a screen, a plurality of openings in said screen, shutter mechanism and means for operating said shutter mechanism whereby the uncovered portions of the several openings are always together equivalent to the whole of one opening.

2. In mechanism for the production of "living pictures" the combination of a main operating shaft, a driving wheel upon said shaft, a plurality of driven shafts carrying pinions gearing with said driving wheel, cams carried by said driven shafts, pins upon said cams, sliding shafts, frames upon said sliding shafts, cam surfaces upon said frames, and arms carried by said frames, with a screen, a plurality of openings in said screen, guides for a film adjacent to said screen, and shutter mechanism operated from the main operating shaft, whereby the uncovered portions of the several openings are always together equivalent to the whole of one opening.

3. In mechanism for the production of "living pictures", the combination of shafts, cams carried by said shaft, pins upon said cams, frames pivoted on sliding shafts, cam surfaces upon said frames, plates, openings in said plates, and shutters mounted on said shafts, said cams, pins, frames, openings and shutters being so related that said frames receive lateral and angular oscillatory movement from said cams, at intervals when said openings are covered by said shutters.

Signed at Melbourne this eighteenth day of November, 1904.

ROBERT THORN HAINES.

Witnesses:
THOMAS FRASER,
WILLIAM ALLAN.